US012066805B2

(12) United States Patent
Liu et al.

(10) Patent No.: US 12,066,805 B2
(45) Date of Patent: Aug. 20, 2024

(54) SYSTEM AND METHOD FOR PRODUCING DISPLAY PANELS BASED ON NONLINEAR PROGRAM MODEL, AND NON-TRANSITORY COMPUTER-READABLE STORAGE MEDIUM

(71) Applicant: BOE TECHNOLOGY GROUP CO., LTD., Beijing (CN)

(72) Inventors: Weihe Liu, Beijing (CN); Dong Chai, Beijing (CN); Haohan Wu, Beijing (CN); Guoliang Shen, Beijing (CN); Tian Lan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 401 days.

(21) Appl. No.: 17/431,790

(22) PCT Filed: Feb. 28, 2020

(86) PCT No.: PCT/CN2020/077160
§ 371 (c)(1),
(2) Date: Aug. 18, 2021

(87) PCT Pub. No.: WO2021/168783
PCT Pub. Date: Sep. 2, 2021

(65) Prior Publication Data
US 2022/0317644 A1 Oct. 6, 2022

(51) Int. Cl.
*G05B 19/042* (2006.01)
(52) U.S. Cl.
CPC ........... *G05B 19/0426* (2013.01); *G05B 2219/13004* (2013.01)
(58) Field of Classification Search
CPC ...... G05B 19/0426; G05B 2219/13004; G06Q 40/02; G06F 17/00
See application file for complete search history.

(56) References Cited

U.S. PATENT DOCUMENTS 5,630,070 A * 5/1997 Dietrich .......... G06Q 10/06313
  705/7.23
7,016,873 B1 * 3/2006 Peterson ................ G06Q 40/02
  705/37

(Continued)

FOREIGN PATENT DOCUMENTS

| CN | 103544547 A | 1/2014 |
|----|-------------|--------|
| CN | 107147116 A | 9/2017 |
| CN | 107481136 A | 12/2017 |

OTHER PUBLICATIONS

European Patent Office, EP20922461.7 Extended European Search Report, Dec. 22, 2022.

*Primary Examiner* — Ziaul Karim
(74) *Attorney, Agent, or Firm* — HOUTTEMAN LAW LLC

(57) ABSTRACT

The present disclosure provides a production programming system based on a nonlinear program model, including: a distributed storage device and an analysis device, wherein the analysis device includes a processor configured to obtain production record information; construct the nonlinear program model based on the production record information; and solve the nonlinear program model to obtain first feasible solutions. The nonlinear program model includes a constraint condition that satisfies process requirements and an objective function indicating pressure equilibrium across the same device set, and each of the first feasible solutions is configured to indicate a production program. The present disclosure further provides a production programming method and a computer-readable storage medium which can improve efficiency and reduce device idleness rate.

15 Claims, 3 Drawing Sheets

(56) References Cited

U.S. PATENT DOCUMENTS

| | | | | |
|---|---|---|---|---|
| 7,369,979 B1* | 5/2008 | Spivey | ............ | E21B 43/14 |
| | | | | 703/2 |
| 10,546,355 B2* | 1/2020 | Babin | ............ | E21B 41/00 |
| 2005/0234579 A1* | 10/2005 | Asmundsson | ......... | G06Q 10/06 |
| | | | | 700/99 |
| 2012/0095733 A1* | 4/2012 | Rossi | ............ | E21B 43/00 |
| | | | | 703/2 |
| 2015/0338550 A1* | 11/2015 | Wadsley | ............ | G06F 17/10 |
| | | | | 703/2 |

\* cited by examiner

SYSTEM AND METHOD FOR PRODUCING DISPLAY PANELS BASED ON NONLINEAR PROGRAM MODEL, AND NON-TRANSITORY COMPUTER-READABLE STORAGE MEDIUM

CROSS-REFERENCE TO RELATED APPLICATION

This application is a National Phase Application filed under 35 U.S.C. 371 as a national stage of PCT/CN2020/077160, filed on Feb. 28, 2020, the contents of which are incorporated herein by reference in their entirety.

TECHNICAL FIELD

The present disclosure relates to the field of manufacturing, and in particular to a production programming system and method based on a nonlinear program model, and a computer-readable medium.

BACKGROUND

Product input efficiency directly affects the production capacity of a factory. Therefore, how to better arrange production and thus increase the production capacity is of great significance to the factory. The conventional manual analysis requires picking out production data to make charts, which is very time-consuming (usually takes about 12 hours). In conventional methods, factory personnel will arrange production plans based on experience in combination with the device production capacity, cycle time (CT) and tact time (TT) of product production, and so on.

SUMMARY

In a first aspect, the present disclosure provides a production programming system based on a nonlinear program model, including: a distributed storage device and an analysis device, wherein: the distributed storage device is configured to store production data generated by a factory device; the analysis device includes one or more processors configured to perform operations including: acquiring production record information within a first historical time period from the production data; constructing a nonlinear program model based on the production record information; and solving the nonlinear program model to obtain multiple first feasible solutions; wherein the nonlinear program model includes a constraint condition that satisfies process requirements and an objective function indicating pressure equilibrium across the same device set, and each of the first feasible solutions is configured to indicate a production program, including a quantity of at least one product to be put into production at multiple time intervals within a first preset time period.

In a second aspect, the present disclosure further provides a production programming method based on a nonlinear program model, including: acquiring production record information within a first historical time period from production data generated at a factory device; constructing a nonlinear program model based on the production record information; and solving the nonlinear program model to obtain multiple first feasible solutions; wherein the nonlinear program model includes a constraint condition that satisfies process requirements and an objective function indicating pressure equilibrium across the same device set, and each of the first feasible solutions is configured to indicate a production program, including a quantity of at least one product to be put into production at multiple time intervals within a first preset time period.

In a third aspect, the present disclosure further provides a computer readable storage medium having a computer program stored thereon which, when executed by a processor, causes the production programming method based on a nonlinear program model as described above to be implemented.

BRIEF DESCRIPTION OF THE DRAWINGS

Accompanying drawings are provided for further understanding of this disclosure and constitute a part of the description. Hereinafter, these drawings are intended to explain the disclosure together with the following specific embodiments, but should not be considered as a limitation to the disclosure. In the drawings.

DETAILED DESCRIPTION OF THE EMBODIMENTS

Figure 1:
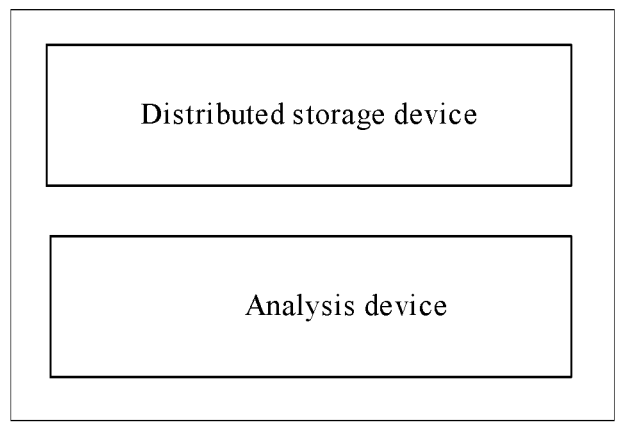
FIG. 1 is a block diagram of a production programming system provided by an embodiment of the present disclosure.

To improve understanding of the technical solution in the embodiments of the present disclosure for those skilled in the art, the production programming system based on a nonlinear program model provided in the embodiments of the disclosure will be described below in detail in conjunction with the accompanying drawings.

Embodiments of the present disclosure will be described more sufficiently below with reference to the accompanying drawings, but which may be embodied in different forms and should not be construed as limited to the embodiments set forth in the disclosure. Rather, these embodiments are provided so that this disclosure will be thorough and complete, and will fully convey the scope of the disclosure to those skilled in the art.

Embodiments described in the disclosure may be described with reference to plan and/or cross-sectional views in idealized representations of the present disclosure. Accordingly, the example illustrations may be modified in accordance with manufacturing techniques and/or tolerances.

Embodiments of the disclosure and features of the embodiments may be combined with each other without conflict.

Terminology used in the disclosure is for the purpose of describing specific embodiments only and is not intended to limit the disclosure. As used in this disclosure, the term "and/or" includes any and all combinations of one or more of the associated listed items. As used in this disclosure, the singular forms "a," "an," and "the" are intended to include the plural forms as well, unless the context clearly indicates otherwise. As used herein, the terms "made of . . . " specifies the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used in the disclosure have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined in the disclosure.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting. Hereinafter, specific embodiments of the present disclosure will be described with respect to the accompanying drawings. It will be appreciated that the specific embodiments as set forth herein are merely for the purpose of illustration and explanation of the disclosure and should not be constructed as a limitation thereof.

Many products (such as display panels) are produced in production lines each having a plurality of process sites, and at each process site, the products (including semi-finished products) are subjected to certain processing (such as cleaning, deposition, exposure, etching, alignment and assembly, test, etc.). At the same time, a plurality of process devices for the same processing are typically provided at each process site. Each product needs to pass through multiple process sites during the production thereof, and different products may pass through different process sites; while products passing through the same process site may be processed by different process devices. Various types of products may be produced simultaneously in the same production line. Therefore, it is necessary to formulate production scheduling based in the production plan and the production capacity of the actual process sites, so that the device capacity at each process site is maximized while ensuring completing the production plan on time. In actual production, for example, in the production line of liquid crystal panels, since as many as hundreds of processes may be involved, and each process may involve tens, hundreds, or even thousands of nodes (such as devices and/or persons, etc.), a production programming system or method is needed to complete production scheduling of a huge production line.

Referring to FIG. 1, the present disclosure provides a production programming system based on a nonlinear program model.

Figure 2:
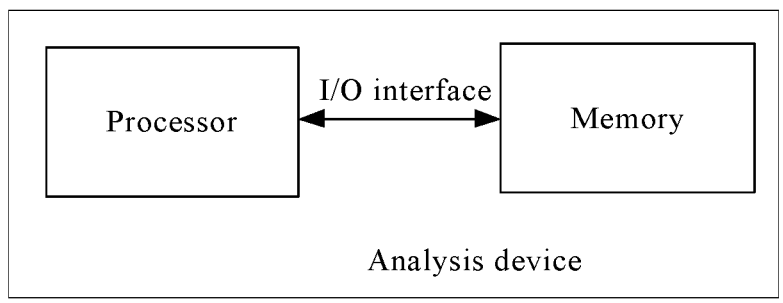
FIG. 2 is a block diagram of an analysis device in the production programming system provided by an embodiment of the present disclosure.
Figure 3:
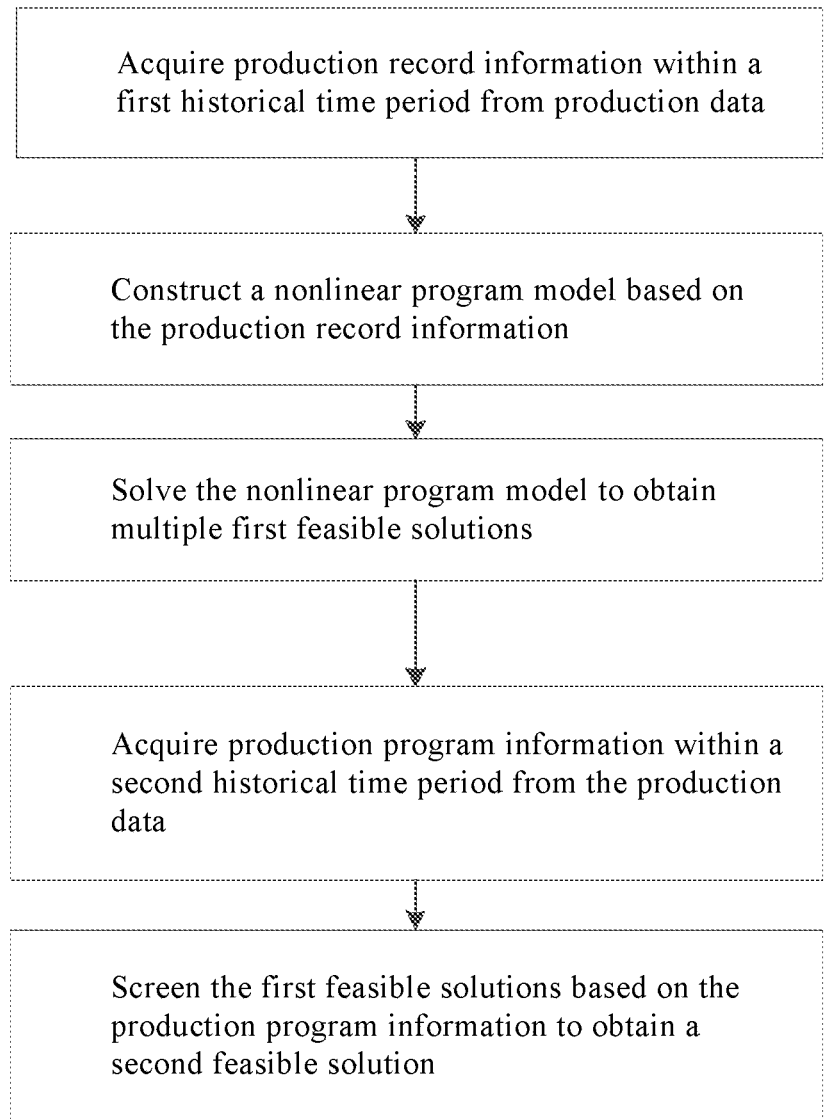
FIG. 3 is a flowchart illustrating operations of the analysis device in the production programming system provided by an embodiment of the present disclosure.

In a first aspect, as shown in FIGS. 1 to 3, an embodiment of the present disclosure provides a production programming system based on a nonlinear program model, including: a distributed storage device and an analysis device, wherein: the distributed storage device is configured to store production data generated by a factory device; the analysis device includes one or more processors configured to perform operations including: acquiring production record information within a first historical time period from the production data; constructing a nonlinear program model based on the production record information; and solving the nonlinear program model to obtain multiple first feasible solutions; wherein the nonlinear program model includes a constraint condition that satisfies process requirements and an objective function indicating pressure equilibrium across the same device set, and each of the first feasible solutions is configured to indicate a production program, including a quantity of at least one product to be put into production at multiple time intervals within a first present time period.

Specifically, the distributed storage device stores production data generated by a factory device. The factory device herein refers to any device in any factory, which may include process devices at each process site, and may include management devices for production lines. The production data refers to any information related to production, including which product is produced in each production line, a quantity of products under production at each process site and each time, CT of each product at each process site, product information and defect information of each product, etc.

The data may be stored in the distributed storage device in a Hive tool or Hbase database format. For example, according to the Hive tool, the above raw data is first stored in a data lake; and then subjected to pre-processing including data cleaning, data conversion and the like in the Hive tool based on an application theme, scenario or the like of the data to obtain data warehouses of different themes (such as production history, test data, device data), and data marts of different scenarios (such as device analysis or parameter analysis). The above data marts may be further connected to a display device, an analysis device or the like through different API interfaces to realize data interaction with these devices.

Since the raw data relates to multiple factory devices of multiple factories, the data volume is very large. For example, the raw data generated by all factory devices every day may reach several hundred gigabytes, and the data generated per hour may even reach tens of gigabytes.

There are mainly two solutions for the storage and computation of massive structured data: a grid computation solution based on a Relational Database Management System (RDBMS); and a big data solution based on a Distributed File System (DFS).

The grid computation solution based on RDBMS involves dividing the problem that requires a huge computation capability into a plurality of small parts, then allocating these parts to a plurality of computers for separate processing, and finally combining the computation results. For example, as a specific example, Oracle RAC (Real Application Cluster) is a core technology of the grid computation supported by the Oracle database, in which any server may directly access any data in the database. However, the application system for grid computation based on RDBMS cannot satisfy user requirements when the data volume is huge. For example, due to the limited expansion space of hardware, when the data is increased to a large enough order of magnitude, the efficiency of data processing will be reduced to a very low level because of the bottleneck of input/output of the hard disk.

The big data technology based on distributed file management allows the use of multiple inexpensive hardware devices to build large clusters for processing of massive data. For example, the Hive tool is a Hadoop-based data warehouse tool that can be used for Extract-Transform-Load (ETL) so that the structured data files are mapped into a database table and a SQL-like query function is provided. The Hive tool defines a simple SQL-like query language, and at the same time, further allows the use of custom mapper and reducer of MapReduce to implement complex analysis tasks that cannot be done by the default tools. The Hive tool does not have a dedicated data storage format, or an index for the data, and thus, a user may freely organize tables therein and process the data in the database. It can be seen that the parallel processing of distributed file management can satisfy the storage and processing requirements of massive data. A user may process simple data through SQL queries, and use custom functions for complex processing. Therefore, when analysing the massive data of the factory, the data in the factory database is required to be extracted into the distributed file system. On the one hand, the raw data is prevented from being damaged, and on the other hand, the efficiency of data analysis is improved.

Referring to FIG. 2, the analysis device includes a processor (such as a CPU) with a data processing capacity, and a memory (such as a hard disk) that stores the required program. The processor and the memory are connected via I/O to achieve information interaction, and thereby, the processor can perform required operations according to the program stored in the memory. In an embodiment of the present disclosure, the analysis device can extract the production data stored in the distributed storage device, and perform the operation of generating production programs based on the nonlinear program model.

In an embodiment of the present disclosure, a nonlinear program model is constructed through an objective function and a constraint condition to solve the production program problem during the production. For the nonlinear program model, the constraint condition is determined based on the process requirements during the production to guarantee product yield, and may include a production duration of each product in the device, a frequency of switching products, whether maintenance is required, etc.; and the constraint condition may be set based on the production record information within the first historical time period. The distributed storage device stores production data generated by a factory device. The first historical time period refers to the historical time period close to the time at which the method of the present disclosure is implemented. The first historical time period may refer to a time period within one day or one hour, which is not limited here. For example, the constraint condition may be set based on an average CT, an average TT or the like of the product produced within one hour so that the average CT and average TT for future production are less than or equal to the average CT and average TT of the product produced in the previous hour. The nonlinear program model in the embodiment of the present disclosure further includes an objective function indicating pressure equilibrium across the same device set. Here, "the same device set" refers to a plurality of process devices for the same processing at the same process site, and the "pressure equilibrium across the same device set" may be understood as a degree of how busy the device set is, for example, which devices are in an operating status and which are in an idle status. Different products may have different process paths and different processing times, but may each require a certain same process. Therefore, the plurality of devices at the same process site may process different products separately, and in order to improve the production efficiency, as many as possible devices of the same device set should keep in an operating status and the processing time is balanced among the devices as much as possible. In the embodiments of the present disclosure, by constructing the constraint condition that satisfies process requirements, production stability and product yield are ensured, by constructing the objective function indicating pressure equilibrium across the same device set, the production efficiency is improved, and by solving the nonlinear program model of the constraint condition and the objective function, more reasonable production programs can obtained as guidance for production.

The first feasible solution may be used as a guidance for the planned production quantity within a phase time, including a quantity of at least one product to be put into production at multiple time intervals within a first preset time period. The first preset time period refers to a future time period in which products are planned to be input. Each product may be put into production in units of products or in units of product lots, that is, a product lot includes a plurality of products. For example, the first feasible solution may be inputting different product lots every hour in the future 24 hours.

The production programming system provided in the embodiments of the present disclosure is used for automated production scheduling, which greatly improves the efficiency, reduces the device idleness rate, and improves the production capacity.

Optionally, the production record information within the first historical time period from the production data may include: one or more of CT, TT, utilization rate, main process path, and plan maintain (PM). CT refers to the time of one process during the production process of the product; TT refers to the time required for completing all production and processing plans of a product; the utilization rate represents a ratio of the actual production capacity of the device to the theoretical capacity; and the main process path represents the main process path for production of a product, not including devices under test and repair. By acquiring the data of CT and TT, the production planning can satisfy the requirements on the device processing time and the waiting time, with the data of utilization rate, a more accurate judgement of the actual production capacity of the device during the planned production is obtained, and with the data of main process path and plan maintain, it is possible to learn the actual production device required for a relevant product and whether the relevant device needs maintenance. The production record information may further include a proportion of paths other than the main process path, time for machine switching products, etc.

By including the above real time production parameters in the production record information within the first historical time period, a more accurate constraint condition used in the nonlinear program model can be obtained so that future production programs can use the existing stable production data as a reference to ensure production stability and product yield.

The constraint condition constructed based on the production record information may include: a constraint condition obtained by performing data cleaning and vectorization on the production record information.

Specifically, data cleaning may be implemented by interpolating missing values in the production record information; deleting duplicate values in the production record information; and deleting incorrect values in the production record information. Missing values, duplicate values, erroneous values, and the like usually need to be dealt with in conjunction with service significance. Specifically, missing values (for example, data loss caused by device malfunctions) are typically completed in an imputation method. For example, for missing CT, a method of mean imputation may be adopted, which is in line with the service significance. For repeated values in the data cleaning process, it is determined whether to delete or keep the data after the service significance is confirmed. For erroneous values (noise data, erroneous data) during the cleaning process, specific statistical rules or service rules are adopted to remove the erroneous data and noise data. By processing outliers in the production record information, more accurate constraint condition can be obtained, and thus more accurate feasible solutions can be obtained from the nonlinear model.

Furthermore, in order to obtain the constraint condition, vectorization of the variables after data cleaning (for example, production data generated by a factory device) is typically required to form the constraint condition. For a constraint condition that is difficult to vectorise, it is expressed in a program. The vectorization method may adopt the following modes:

(1) Dualization

The process of dualization is to convert a numeric attribute into a Boolean attribute, and set a threshold as a separation point for dividing attribute values between 0 and 1.

(2) One-Hot Encoding

In One-Hot Encoding, an N-bit status register is used for encoding N possible values. Each status is represented by an independent register, and only one of the bits is valid at any time. This is a commonly used vectorization method for converting a character-type feature to a numeric feature. For example, for the processing of the main process path, there are five sites, S1 to S5, and S1, S2, S3, and S5 are passed through, which can be expressed as 11101 in One-Hot Encoding.

For discrete features, the number of dimensions used for representing the features corresponds to the number of values. For example, the device status may have a value 0 (the device is not in PM; that is, the device is available at the time) or a value 1 (the device is in the PM; that is, the device is not available at the time). The device status is subjected to One-Hot Encoding. That is, device available: 01; device not available 10. For a clean device:

|  | PM_clean_y | PM_clean_n |
| --- | --- | --- |
| Available | 0 | 1 |
| Not available | 1 | 0 |

The constraint condition is expressed as: at time t+N, $num_{clean} <= num(PM\_clean\_n==1)$, which indicates that at time t+N, the number of the used clean devices satisfies the constraint condition of: not greater than the number of currently available devices (devices not in maintenance).

Constraint data that cannot be converted into a numerical value may be expressed as a program, i.e., establishing a rule constraint condition, such as data indicating a temporal sequence, an input sequence, and so on. For example, when time can be constrained and t1 is not earlier than t2, it is expressed as: t1<t2, which serves as one of the constraint conditions for the linear program model.

For the objective function of the nonlinear program, the objective function for indicating pressure equilibrium across the same device set satisfies the following condition: a standard deviation of pressure values on all production devices in the same device set within a second preset time period is less than a predetermined value.

The nonlinear program model is a method to solve the optimization problem with one or several nonlinear functions in the objective function or constraint condition. In this embodiment, the objective function is configured to reflect a degree of pressure equilibrium across the device set, and the pressure of the device set takes a value in the range between 0 and 1.0 in the programmed expression. The expression may be, for example:

1−num_idle_eqp/num_all_eqp, where num_idle_eqp: the number of idle devices; and
num_all_eqp: the number of devices in the device set.

The constraint condition may be obtained by, for example, considering production data like CT, TT, utilization rate, main process path, PM, a proportion of paths other than the main process path, and time for machine switching products and vectorising the production data to form the constraint condition of the nonlinear program. For example:

Constraint condition 1: the TT constraint of a clean device may be expressed as s.t. TactTimeeqp_clean_1<20 min.

Constraint condition 2: the constraint of the proportion of paths (in repair and test) other than the main process path may be expressed as num(Pathtest_and_repair)/num(Pathtotal)<0.1.

Constraint condition 3: the constraint of the time for machine switching products may be expressed as 5 min<timeproduct1−timeproduct2<10 min.

Computation of the feasible solution solved from the nonlinear program will theoretically obtain an infinite solution set, which in practice is also a set of multiple solutions. Therefore, the solution set needs to be filtered from the perspective of practicality. First of all, uniformity should be ensured, because the input of the same type of product is as uniform as possible. This is a strategy that can shorten the feasible solutions. Secondly, the uniformity is used as an evaluation index. The final solution to be solved by the production program is pressure equilibrium across the device set. Different devices in the same device set (i.e., a set of devices with similar functions) may replace each other in function to a certain extent. Therefore, the pressure equilibrium of the entire device set, rather than pressure equilibrium of a single device, is emphasized here. For example, for the device set consisting of a clean device 1, a clean device 2, and a clean device 3, a small pressure standard deviation across the three devices is expected, which means that it is impossible for a single device (e.g., clean device 1) to work all the time while other devices, such as clean devices 2 and 3, are idle. Therefore, when judging whether the pressure of the device set is in equilibrium, the pressure standard deviation of the device set in the time dimension should be considered. An objective function min: (std) should be configured such that a minimum pressure standard deviation of the device set is obtained under the constraint of an upper limit of device set pressure. That is:

Objective function: min: (std) results in the minimum pressure standard deviation (std) of the device set;
s.t. upper limit of device set pressure.

In that, s.t. upper limit of device set pressure means being subjected to the constraint of the upper limit of device set pressure.

Among the feasible solutions for production programming, some feasible solutions result in a relatively small pressure standard deviation of the device set in a future time T (a second preset time), which are considered as preferred feasible solutions. The time T (the second preset time) may be the longest production cycle among the production cycles of several products in the production programs.

By considering pressure equilibrium of the device set, a more uniform feasible solution can be obtained. Therefore, it is ensured that the production devices in the device set are operated in a balanced manner, which improves the production efficiency and prolongs the service life of the production devices.

The step of solving the nonlinear program model to obtain multiple first feasible solutions may further include: performing iteration based on a gradient descent algorithm to obtain multiple first feasible solutions that satisfy the nonlinear program model. The iterative rule of the gradient descent algorithm includes: updating parameters along a direction of gradient descent (that is, making the objective function descend in this direction) to continuously find a feasible solutions that is better than a current solution; and obtaining a series of feasible solutions after a certain number of iterations.

Specifically, a first production plan may be initialized first. If the first production plan satisfies the constraint condition and the objective function is less than a predetermined value, the first production plan is a first feasible solution, and iteration is performed based on a gradient descent algorithm to obtain multiple first feasible solutions that satisfy the nonlinear program model. In an embodiment of the present disclosure, the first production plan is a preset production program, that is, it may be one of the first feasible solutions that in line with the production program. The first production program may be a historical production plan that has been implemented, or may be a setting made by an experienced staff based on actual production conditions, which is not limited herein. Based on the initialized first production plan and the iteration based on the gradient descent algorithm, multiple first feasible solutions satisfying the nonlinear program model can be obtained.

Figure 4:
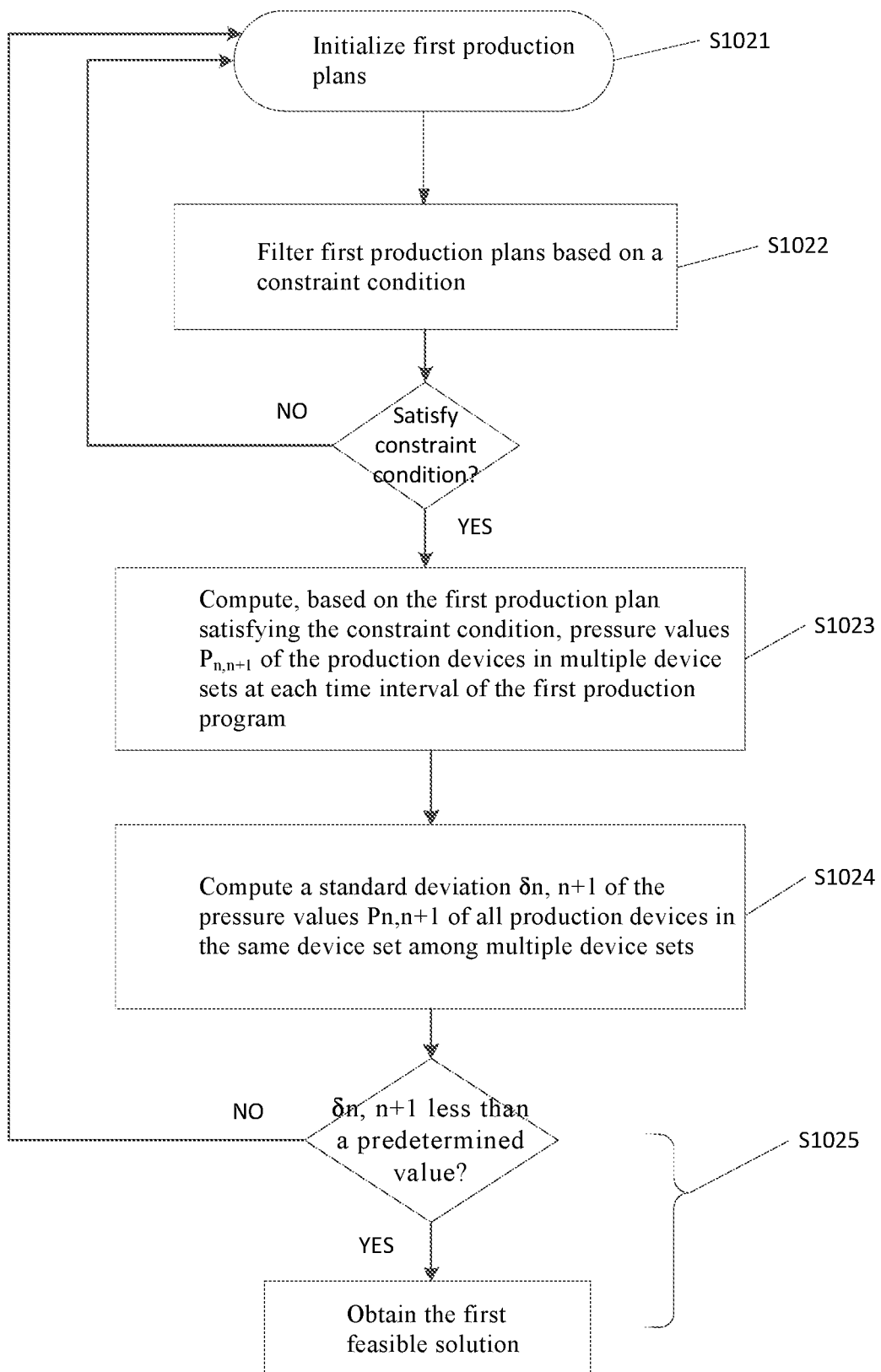
FIG. 4 is an operation flowchart provided by an exemplary embodiment of the present disclosure.

For example, as shown in FIG. 4, in some embodiments, the step of performing iteration based on the gradient descent algorithm to obtain multiple first feasible solutions that satisfy the nonlinear program model includes the following steps S1021 to S1025.

At S1021: initializing first production plans (that is, setting input of production scheduling). The first production plans include at least type and quantity An, Bn, Cn . . . Zn of the products input at respective time nodes (typically exact hours within 24 hours), where A, B, C . . . Z represent different products, n represents different times, and An=X can represent the type and quantity of a product at a specific time node.

At S1022: filtering first production plans based on a constraint condition. This is a first screening and iteration based on the production constraint condition. If the type and quantity An, Bn, Cn . . . Zn of the products in a first production program do not satisfy the constraint condition, the type and quantity An, Bn, Cn . . . Zn of the products input at each time node are modified, and the modification may be made artificially based on prior knowledge.

At S1023: computing, based on the first production plan satisfying the constraint condition, pressure values $P_{n,n+1}$ of the production devices in multiple device sets at each time interval of the first production program. Here, n represents different times, n+1 represents a next time, and $P_{n,n+1}$ represents pressure values at the time interval from time n to time n+1.

At S1024: computing a standard deviation δn, n+1 of the pressure values $P_{n,n+1}$ of all production devices in the same device set among multiple device sets, where m represents the number of devices, P represents an average pressure, std means standard deviation (arithmetic square root of variance), and $$\overline{P}=P_{e1}+P_{e2}+\ldots+P_{em}$$

$$std=\sqrt{(P_{e1}-\overline{P})^2+(P_{e2}-\overline{P})^2+\ldots+(P_{e1}-\overline{P})^2}$$

At S1025: taking, when the standard deviation σn, n+1 is less than a predetermined value, the type and quantity of the input products between time nodes n and n+1 as the first feasible solution. The predetermined value may be selected according to the historical data of the production plan, as long as the pressure equilibrium across the device set is ensured.

After a first feasible solution is obtained, parameters are updated along a direction of gradient descent (that is, the objective function is made to descend in this direction) to continuously find a feasible solutions that is better than a current solution, thereby obtaining a series of feasible solution sets. For example, when the first production plan satisfies the above screening condition and is taken as one of the multiple first feasible solutions, the parameters in the first production plan are updated along the gradient descent direction to repeat the above screening. By performing iteration based on a gradient descent algorithm, a feasible solution better than the current solution is continuously found, so that multiple first feasible solutions that satisfy the nonlinear program model are obtained, and a series of feasible solutions are obtained after a certain number of iterations.

In an embodiment of the present disclosure, guidance may be provided for the production program based on the obtained multiple first feasible solutions, but the first feasible solutions can be further screened since a large number of first feasible solutions may be present. Therefore, after solving the nonlinear program model to obtain multiple first feasible solutions, the processor may be further configured to perform operations including:

acquiring production program information within a second historical time period from the production data, and screening the first feasible solutions based on the production program information to obtain a second feasible solution, wherein the second feasible solution is configured to indicate a production program.

The second historical time period has a time cycle greater than the first historical time period. The second historical time period may be a time cycle within one week or several weeks before the first historical time period. The production program information refers to production data in the second historical time period, that is, the quantity of at least one product put into production at each time node (for example, every 1 hour) within the second historical time period. Data in the historical production data that has high production efficiency and can ensure smooth progress of the production is dug out and compared with the first feasible solutions to screen a smaller number of preferred second feasible solutions. Each of the second feasible solutions is configured to indicate a production program.

The step of screening the first feasible solutions based on the production program information in the second historical time period to obtain second feasible solutions may include at least one of the following cases:

(1) a total number of production times of the same product within a first preset time period in the second feasible solutions does not exceed a maximum number of production times of the product within the first preset time period in the production program information. For the second feasible solutions, it represents a quantity of at least one product to be put into production at multiple time intervals within a first preset time period. For a specific product, it may be included or not included in the production plan at each time interval, and the number of time intervals that include the product in the first preset time period is the number of production times of the product in the first preset time period. For example, if a product A is put into production in 5 out of 24 hours of the production plan, the number of production times of product A is 5. In an embodiment of the present disclosure the second feasible solutions are screened. Assuming that the maximum number of production times of product A within 24 hours in the historical data is 10, then in the second feasible solutions, the total number of production times of product A within 24 hours cannot exceed 10.

In an embodiment of the present disclosure, the maximum number of production times should be data at the time of reasonable production in the historical data. If the maximum number of production times 15 of product A has appeared only once in the historical data, and the second maximum number of production times 10 has appeared 9 times, then 15, which has appeared only once, may be abnormal production data, and 10 should be used for computation as the maximum number of production times of product A.

(2) An input time interval between adjacent lots of the same product in the second feasible solution does not exceed a minimum input time interval between adjacent lots of the product in the production program information. The products are put into the production device in lots, and a lot may include 10 or 20 products, which is not limited herein. According to the second feasible solution, the input time interval of each lot can be obtained. If the input time interval is too small, it may cause product backlog and overload the device. Therefore, it is necessary to ensure that the input time interval of adjacent lots does not exceed a reasonable minimum input time interval in the historical data.

For example, if the minimum input time interval between adjacent lots of product B in the production program information of the historical data is 12 min, then in the second feasible solution, the minimum input time interval for each lot of product B cannot be less than 12 minutes.

In an embodiment of the present disclosure, the second feasible solutions may be screened based on service rules to further reduce the number of feasible solutions. That is, after a second feasible solution is obtained, it is judged whether a dispersion degree of the production lots at each time interval of the second feasible solution within the first preset time period is within a predetermined range; and if so, the second feasible solution is used for guiding a production program; if not, the second feasible solution is deleted.

For example, if the first preset time is 24 hours and the time interval is 1 hour, the dispersion degree may be expressed as:

$$\sqrt{\frac{1}{24}\sum_{i=1}^{24}[num(lot_i) - num(lot\overline{X})]^2}$$

$lot_i$: the number of lots input in the $i^{th}$ hour, lot $\overline{X}$: an average number of the input lots within 24 h (in units of hours).

In addition, further screening may be performed based on other service rules, for example, the start time of each lot is an exact hour within 24 hours, and the input time interval between adjacent lots of products is a multiple of 3 minutes, and so on. Service rules can be used to effectively reduce the scope of feasible solutions and ensure that the production program is in line with historical production of the factory. It should be understood that the service rule is not limited to the examples disclosed herein.

Optionally, the data in the distributed storage device is stored in a data warehouse, and one or more processors are configured to perform data computation based on a Spark compute engine.

The following describes the operation of the production programming system of the disclosure with reference to a specific implementation.

(1) Data source: Management Data Warehouse (MDW), is extracted to Hive using sqoop.
(2) Use Spark compute engine for computation. The Industrial Internet has greatly improved the level of the manufacturing industry, and led to a large-scale and rapid growth of industrial data. As a result, it is no longer possible to process such large-scale industrial data with a single computer. As a distributed computing framework, Spark can perform lot data processing with high performance using the advanced DAG scheduler and physical execution engine. The memory-based compute engine stores intermediate computation results in a distributed memory (RAM), which has a fast computation speed and low latency. Therefore, computing and solving with a Spark program when seeking for an optimal solution in a nonlinear program algorithm can complete daily production scheduling in the order of minutes, and the efficiency is extremely high. A main object of the Spark compute engine is distributed collection of items, called Resilient Distributed Datasets (RDDs), which can be distributed to individual nodes in a cluster for parallel operation. RDDs may be created from HDFS files; or may be transformed from other RDDs, for example: sc.parallelize(xrange(0, NUM_SAMPLES)).filter(func).count( )
(3) Visualize the results. The visualized content may include at least two of: product input (planned input) computed by algorithm at each time point, and product input (time input) in the actual production process of the factory based on the algorithm and the actual situation. The above results may be shown in a horizontal and vertical coordinate system. The horizontal axis represents the time point, each time point having a comparison of planned input and actual input, and the vertical axis represents the number of lots. For example: at 6 o'clock, it is planned to input 4 lots of product A and 6 lots of product B, and in practice, 4 lots of product A and 6 lots of product B are input. At 7 o'clock, it is planned to input 4 lots of product A, 2 lots of product B, and 2 lots of product C, but in practice, 4 lots of product A, 2 lots of product B, and 3 lots of product C are input.

Exemplarily, in an implementation, the specific steps performed by the production programming system include: 1. using Spark to read data in Hive, in which configuration files hive-site.xml, core-size.xml, and hdfs-site.xml are required. Spark implements operations on the Hive data by reading these configuration files and initializing the context.

```
Val conf=new
SparkConf(          ).setMaster("master").setAppName
    ("SparkHive")
val sc=new SparkContext(conf)
val hc=new HiveContext(sc)
hc.sql("select * from mt1")
```

2. Initializing the quantity An, Bn, Cn . . . Zn of products input at each time node. A, B, C . . . Z represent different products. N represents different times.
3. Filtering according to a constraint condition, if the planned quantity An, Bn, Cn . . . Zn of the product satisfies the constraint condition, proceed to the next step of computation; otherwise skip to step 6.
4. Using a flatmap operator of Spark to compute a pressure Pn of each device in different time periods in parallel. This improves the computation efficiency.

```
var        Pn_s=datas.flatmap(ComputeStress
    (cycletime,An,Bn . . . ,Zn))
```

5. Computing a pressure standard deviation across all the devices.

```
var Pst=ComputeST(Pn_s)
```

$(((Ps\_e1-Ps\_mean)2+ \ldots +(Ps\_en-Ps\_mean)2)/n)^{1/2}$, where Ps_e1 represents a pressure of a device e1 in a device set s, and Ps_en represents a pressure of a device en in the device set s.

6. Modifying the quantity An, Bn Zn of the input products at each node, and repeating steps 2 to 4. The device pressures under different conditions are computed and compared, and compared with a previously computed pressure value until an optimal solution An, Bn, Cn . . . Zn is found. The optimal solution minimizes the pressure standard deviation Pst of the device. The optimal solution is a plan corresponding to the optimal type and quantity of the input products.
7. Visualizing the production plan corresponding to the optimal solution. Optionally, a display device is configured to display the number of product lots planned to input at each time point of the production program and the number of product lots input at each time point in the actual production at the factory. It helps to visually observe the real time comparison of the planned and the actual production, and is conducive to timely adjustment and production.

Through the production programming system based on a nonlinear program model of the present disclosure, the massive production data generated by the factory devices is stored via hive in the distributed storage device, the massive data is dug based on the analysis device, and the flatmap operator of spark is used for a rapid technology, thereby enabling the automated production scheduling to be completed in the order of minutes, and achieve a substantial increase in the factory production capacity.

In a second aspect, the present disclosure further provides a production programming method based on a nonlinear program model, including: acquiring production record information within a first historical time period from production data generated at a factory device; constructing a nonlinear program model based on the production record information; and solving the nonlinear program model to obtain multiple first feasible solutions; wherein the nonlinear program model includes a constraint condition that satisfies process requirements and an objective function indicating pressure equilibrium across the same device set, and each of the first feasible solutions is configured to indicate a production program, including a quantity of at least one product to be put into production at multiple time intervals within a first preset time period.

The production programming method of the present disclosure may be applied to automated production scheduling, which greatly improves the efficiency, reduces the device idleness rate, and improves the production capacity.

Optionally, after the step of solving the nonlinear program model to obtain multiple first feasible solutions, the method further includes: acquiring production program information within a second historical time period from the production data, and screening the first feasible solutions based on the production program information to obtain a second feasible solution, wherein the second feasible solution is configured to indicate a production program.

Optionally, the objective function indicating pressure equilibrium across the same device set satisfies the following condition: a standard deviation of pressure values on all production devices in the same device set within a second preset time period is less than a predetermined value.

Optionally, the step of solving the nonlinear program model to obtain multiple first feasible solutions includes: performing iteration based on a gradient descent algorithm to obtain multiple first feasible solutions that satisfy the nonlinear program model.

Optionally, the step of screening the first feasible solutions based on the production program information to obtain the second feasible solution includes at least one of the following cases:
  a total number of production times of the same product within a first preset time period in the second feasible solution does not exceed a maximum number of production times of the product within the first preset time period in the production program information; and
  an input time interval between adjacent lots of the same product in the second feasible solution does not exceed a minimum input time interval between adjacent lots of the product in the production program information.

In a third aspect, the present disclosure further provides a computer readable storage medium having a computer program stored thereon which, when executed by a processor, causes the production programming method based on a nonlinear program model as described above to be implemented.

Those of ordinary skill in the art will appreciate that all or some steps of the above described method, functional modules/units in the system and apparatus may be implemented as software, firmware, hardware, and suitable combinations thereof.

In a hardware implementation, the division between the functional modules/units mentioned in the above description does not necessarily correspond to the division of physical components; for example, one physical component may have multiple functions, or one function or step may be performed cooperatively by several physical components.

Some or all physical components may be implemented as software executed by a processor, such as a CPU, a digital signal processor or microprocessor, or implemented as hardware, or implemented as an integrated circuit, such as an application specific integrated circuit. Such software may be distributed on a computer storage medium (or non-transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, a random access memory (RAM, more specifically SDRAM, DDR, etc.), a read only memory (ROM), an electrically erasable programmable read only memory (EEPROM), a flash memory (FLASH), or other disk storage; a compact disk read only memory (CD-ROM), a digital versatile disk (DVD), or other optical disk storages; a magnetic cassette, a magnetic tape, a magnetic disk storage or other magnetic storage devices; or any other media which can be used to store the desired information and accessed by a computer.

It will be appreciated that the above implementations are merely exemplary implementations for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A system for producing display panels based on a nonlinear program model, comprising: a distributed storage device, an analysis device, and a production line, wherein:
the distributed storage device is configured to store production data generated by a factory device;
the analysis device comprises one or more processors configured to perform operations comprising:
acquiring production record information within a first historical time period from the production data;
constructing a nonlinear program model based on the production record information; and
solving the nonlinear program model to obtain multiple first feasible solutions;
wherein the nonlinear program model comprises a constraint condition that satisfies process requirements and an objective function indicating pressure equilibrium across the same device set,
each of the first feasible solutions is configured to indicate a production program, comprising a quantity of at least one product to be put into production at multiple time intervals within a first preset time period, and
the production line is configured to produce the display panels according to the production program,
wherein after the step of solving the nonlinear program model to obtain multiple first feasible solutions, the operations further comprise:
acquiring production program information within a second historical time period from the production data, and
screening the first feasible solutions based on the production program information to obtain a second feasible solution, wherein
the second feasible solution is configured to indicate a production program,
wherein the step of screening the first feasible solutions based on the production program information to obtain the second feasible solution comprises at least one of the following cases:
a total number of production times of the same product within a first preset time period in the second feasible solution does not exceed a maximum number of production times of the product within the first preset time period in the production program information; and
an input time interval between adjacent lots of the same product in the second feasible solution is not less than a minimum input time interval between adjacent lots of the product in the production program information.

2. The system according to claim 1, wherein the production record information comprises one or more of cycle time, tact time, utilization rate, main process path, and plan maintain.

3. The system according to claim 2, wherein the constraint condition constructed based on the production record information comprises:
a constraint condition obtained by performing data cleaning and vectorization on the production record information.

4. The system according to claim 3, wherein the objective function indicating pressure equilibrium across the same device set satisfies the following condition:
a standard deviation of pressure values on all production devices in the same device set within a second preset time period is less than a predetermined value.

5. The system according to claim 1, wherein the step of solving the nonlinear program model to obtain multiple first feasible solutions comprises:
performing iteration based on a gradient descent algorithm to obtain multiple first feasible solutions that satisfy the nonlinear program model.

6. The system according to claim 1, wherein after acquiring the second feasible solution, the operations further comprise:
judging whether a dispersion degree of the production quantity at each time intervals of the second feasible solutions within the first preset time period is within a predetermined range; and
if so, using the second feasible solution for guiding a production program.

7. The system according to claim 1, wherein the one or more processors are configured to perform data computation based on a Spark compute engine.

8. A method for producing display panels based on a nonlinear program model, comprising:
acquiring production record information within a first historical time period from production data generated at a factory device;
constructing a nonlinear program model based on the production record information; and
solving the nonlinear program model to obtain multiple first feasible solutions;
wherein the nonlinear program model comprises a constraint condition that satisfies process requirements and an objective function indicating pressure equilibrium across the same device set,
each of the first feasible solutions is configured to indicate a production program, comprising a quantity of at least one product to be put into production at multiple time intervals within a first preset time period, and
producing the display panels according to the production program,
wherein after the step of solving the nonlinear program model to obtain multiple first feasible solutions, the method further comprises:
acquiring production program information within a second historical time period from the production data, and
screening the first feasible solutions based on the production program information to obtain a second feasible solution, wherein
the second feasible solution is configured to indicate a production program, wherein the step of screening the first feasible solutions based on the production program information to obtain the second feasible solution comprises at least one of the following cases:
a total number of production times of the same product within a first preset time period in the second feasible solution does not exceed a maximum number of production times of the product within the first preset time period in the production program information; and
an input time interval between adjacent lots of the same product in the second feasible solution does not exceed a minimum input time interval between adjacent lots of the product in the production program information.

9. The method according to claim 8, wherein the objective function indicating pressure equilibrium across the same device set satisfies the following condition:
a standard deviation of pressure values on all production devices in the same device set within a second preset time period is less than a predetermined value.

10. The method according to claim 9, wherein the step of solving the nonlinear program model to obtain multiple first feasible solutions comprises:
performing iteration based on a gradient descent algorithm to obtain multiple first feasible solutions that satisfy the nonlinear program model.

11. A non-transitory computer-readable storage medium having a computer program stored thereon which, when executed by a processor, causes the method according to claim 9 to be implemented.

12. The method according to claim 8, wherein the step of solving the nonlinear program model to obtain multiple first feasible solutions comprises:
performing iteration based on a gradient descent algorithm to obtain multiple first feasible solutions that satisfy the nonlinear program model.

13. A non-transitory computer-readable storage medium having a computer program stored thereon which, when executed by a processor, causes the production method according to claim 12 to be implemented.

14. A non-transitory computer-readable storage medium having a computer program stored thereon which, when executed by a processor, causes the method according to claim 8 to be implemented.

15. The method according to claim 8, wherein the step of solving the nonlinear program model to obtain multiple first feasible solutions comprises:
performing iteration based on a gradient descent algorithm to obtain multiple first feasible solutions that satisfy the nonlinear program model.

* * * * *